United States Patent Office 3,217,015
Patented Nov. 9, 1965

3,217,015
BIREACTIVE COMPOUNDS CONTAINING OXIRANE UNIT AND ETHANETHIOL GROUP IN SAME MOLECULE
William R. Nummy, Midland, Mich., assignor to The Dow Chemical Company, Midland, Mich., a corporation of Delaware
No Drawing. Original application Nov. 3, 1958, Ser. No. 771,247. Divided and this application Oct. 16, 1961, Ser. No. 145,470
2 Claims. (Cl. 260—348)

The present invention resides in and contributes to the organic chemical arts. In particular, the present invention is concerned with novel bireactive compounds and to a method for their preparation. More specifically, this invention relates to monomeric, bireactive compounds which contain an oxirane ring or unit (i.e., an epoxy group) arranged in the same molecule with an ethanethiol group.

The present application is a division of the copending, but herewith abandoned, application for United States Letters Patent having Serial No. 771,247, filed November 3, 1958, which parent application embraced subject matter divided from and was a continuation-in-part of the application for United States Letters Patent having Serial No. 571,848, which was filed on March 15, 1956, now abandoned.

Bireactive compounds according to the invention are comprised of those, in the monomeric and unpolymerized form, having the general formula:

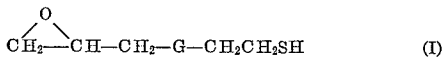

$$CH_2\!\!-\!\!\!\overset{O}{\overset{\diagdown}{\phantom{O}}}\!\!\!CH\!\!-\!\!CH_2\!\!-\!\!G\!\!-\!\!CH_2CH_2SH \qquad (I)$$

wherein G is a bivalent polyether (frequently a diether) radical from a glycol obtained, as it were, by removal of the terminal, oxygen-connected hydrogens therefrom. Advantageously, G is a bivalent diether radical from a glycol having from 2 to about 6 carbon atoms in its molecule. Illustrative of the general type of arrangement of such radicals are: (a) —O$(CH_2)_x$O—, in which $x$ is an integer from 2 to about 6 (as in the divalent butane diol radicals of the structure:

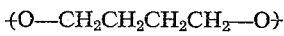

$$-\!(O\!\!-\!\!CH_2CH_2CH_2CH_2\!\!-\!\!O)-$$

and homologous divalent polymethylene diol radicals of from 2 to about 6 carbon atoms); (b)

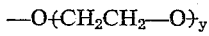

$$-\!O(CH_2CH_2\!\!-\!\!O)_y\!\!-$$

in which $y$ is an integer from 1, or, to avoid duplication of certain of the species of type (a) above, from 2 to 3 (as in the radicals from ethylene glycol and the lower polyethylene glycols); and (c) —O$(CH_2CH(CH_3)$—O$)_z$, in which $z$ is an integer from 1 to 2 (as in the radicals from propylene glycol and dipropylene glycol). As is apparent, the radicals represented by the symbol G may frequently consist of those having one or more inner oxygen or heteroether linkages in their constitution.

The bireactive compounds of the Formula I may conveniently be prepared by a method in accordance with the present invention which comprises converting a corresponding vinyl glycidyl ether to the desired product. Such vinyl ethers may be obtained by first forming an alkali metal alcoholate of a monovinyl ether of a glycol and reacting it with epichlorohydrin. To such intermediate (or, actually, for present purposes, starting) product the thiol group is introduced in the molecule as hereinafter delineated. Advantageously, in preparing the corresponding vinyl glycidyl ether of the glycol, the alcoholate may be obtained from the vinyl ether with a solid alkali metal caustic material such as solid potassium hydroxide. The desired thiol-containing compounds are prepared readily from the epoxidized intermediate by subjecting a vinyl radical-containing bireactive compound of the type referred to (i.e., the vinyl glycidyl ether of a glycol) to the so-called abnormal addition of hydrogen sulfide under free radical generating conditions.

The reaction to form the intermediate (or starting) corresponding vinyl glycidyl ether of the glycol may be conducted under any desired pressure at a temperature between about 20° C. and 100° C. and, more advantageously, at a temperature between about 20° C. and 50° C. in order to minimize the polymerizing tendency of the corresponding vinyl compound which is obtained. It is beneficial to employ at least about 2 moles of the monovinyl ether of a glycol and about 2 moles of the epichlorohydrin per mole of the solid caustic in order to prepare the vinyl glycidyl ether of the glycol. Preferably, about 3 moles of the monovinyl ether of a glycol and about 3 moles of the epichlorohydrin are employed per mole of solid caustic. The excessive amount of the monovinyl ether functions as a solvent for the alkali metal alcoholate of the ether which is preliminarily formed for subsequent reaction. The greater proportion of epichlorohydrin minimizes the reactive propensity of the epoxy group attached in the molecule of the corresponding bireactive vinyl compound in the course of its preparation. Anhydrous conditions are preferred for such a reaction.

The vinyl glycidyl glycol ether-forming reaction can ordinarily be completed within one or two hours. It is only limited as to time by that period which may be necessary, as a practical matter, to introduce the total amount of the epichlorohydrin while maintaining a desired temperature during the exothermic reaction which occurs.

The free radical generating conditions which are beneficial for preparing the presently contemplated thiol-containing bireactive compounds of the Formula I from the corresponding vinyl glycidyl ether of the glycol by abnormal addition of hydrogen sulfide thereto may be provided, for example, under the excitation of actinic light. It is usually desirable for optimum results in the abnormal addition to employ at least a stoichiometric quantity of the hydrogen sulfide. Generally, best results are achieved when considerable excesses of the hydrogen sulfide are utilized. Advantageously, actinic light having a greater wave length than about 3,000 A. may be employed, particularly when the reaction is assisted by employment of a suitable photosensitizing amount of a photosensitizer in the reaction mass. Such photosensitizers as one selected from the group consisting of 2,5-dichlorostyrene, divinylbenzene, anthracene, fluorene, mixtures thereof and the like are utilized with great benefit for such purpose. Ordinarily, an amount of the photosensitizer between about 0.01 and 5.0 percent by weight (more advantageously, an amount between about 0.1 and 1.0 percent by weight) of photosensitizer may be satisfactorily utilized for such purposes.

The bireactive compounds of the present invention are especially useful for the preparation of polymer products which oftentimes have elastomeric properties and are particularly well adapted for employment as adhesives or binders of the pressure-sensitive, relatively disjoinable variety. Such polymers are well suited in many instances for joining, especially with the indicated type of bond, such diverse materials as wood to metal (as aluminum) or glass, etc. In addition, the polymeric products of the present invention have good utility in and for the formulation, following generally conventional techniques and preparations, of coating compositions and in preparing polymer blends with (or to modify) other polymeric materials to obtain relatively elastomeric products of oftentimes highly desirable characteristics. Certain of the polymer products, particularly when carefully polymerized, are capable of providing relatively tough, rubbery products that quite often are adapted to being molded or otherwise fabricated, or shaped to conform upon setting up during polymerization to the container in which they are polymerized, so as to produce useful articles and constructions for many of a wide variety of purposes.

The polymerization of the monomeric, bireactive compounds of the Formula I can ordinarily be best effected under the influence of basic catalysts (such as diethylene triamine or N,N-dimethyl dodecylamine and the like). The polymerizations may be conducted by using mass (or bulk) polymerization procedures. Since the polymerization reaction under basic catalysis is exothermic in nature, it may generally be initiated at room temperature. However, if desired, elevated starting and polymerization temperatures (as in the range from say 60–100° C. or so) may also be employed. The time that may be required for polymerization of a given system may vary from a few hours or less (down to matters of mere minutes) to several days, depending (among other factors as will be apparent to those with the skill of their calling) on the specific materials and proportions involved as well as the particular conditions under which the reaction is accomplished.

Further manifestations of the present contribution are provided in and by the following representative illustrations which are merely docent in nature and are not intended to be limiting or restrictive of the invention.

*Illustration "A"*

About 150 grams of the monovinyl ether of diethylene glycol and 21.6 grams of potassium hydroxide in pellet form were stirred together until dissolution of the solid caustic material had occurred. About 10 milliliters of the ether was then removed from the mass by vacuum distillation in order to insure the complete absence of water therein. About 96 grams of epichlorohydrin was then added with stirring in uniform increments over a period of about one hour so as to maintain a temperature of about 20–80° C. in the reaction mass. After the entire quantity of the epichlorohydrin had been added, the reaction mass was maintained at about 80° C. for an additional one hour period. At the end of this time, the unreacted epichlorohydrin was removed by distillation and the potassium chloride salt which had formed in the reaction mass was filtered off. The balance of the reaction mass was fractionally distilled under vacuum. About 35.5 grams of the vinyl glycidyl ether of diethylene glycol, having the formula:

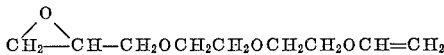

was thereby obtained under a pressure of about 1 millimeter of mercury in the temperature range from about 90 to 93° C. The yield of this material, based on the quantity of the caustic employed, was about 50 percent.

About 200 grams of the thereby prepared vinyl glycidyl ether of diethylene glycol and 750 grams of hydrogen sulfide were then placed in a pressure reactor having a capacity of about 1500 cubic centimeters under an autogeneous pressure of about 220–250 pounds per square inch (gauge). About 0.5 gram of 2,5-dichlorostyrene was incorporated in the reaction mass as a photosensitizer. The pressure reactor had a built-in well of "Pyrex" glass which permitted illumination of the contents. It was also equipped with an efficient agitating mechanism. A General Electric Type AH–6 lamp was employed in the well as a source of ultraviolet radiation to obtain a substantial preponderance of light waves through the glass well having a wave length greater than about 3,000 A. The reaction mass was subjected to about 30 minutes of radiation from the ultraviolet source while it was being maintained at a temperature of about 0–10° C. At the end of this period the reaction was terminated. Excess hydrogen sulfide was removed by evaporation. The reaction mass was subsequently subjected to a vacuum distillation. About 115 grams of a monomeric epoxymercaptan bireactive compound was obtained as the fraction boiling at a temperature of about 150° C. under about 1 millimeter of mercury pressure. It was identified as being the compound 2,(2-(2,3-epoxypropoxy) ethoxy-)ethoxy) ethanethiol and had the general formula:

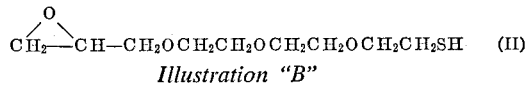

*Illustration "B"*

To a quantity distilled sample of 2,(2-(2,3-epoxypropoxy) ethoxy-)ethanethiol of the Formula II (boiling from 130 to 140° C. under an absolute mercury pressure of about 0.4 millimeter) there was added, at room temperature, a trace (approximately 0.1 weight percent on the weight of the mass) of N,N-dimethyl dodecylamine. Within a few minutes, an easily evident oxothermic reaction commenced. The viscosity of the liquid increased rapidly until a rubbery polymer product of the polymerized bireactive compound was obtained. The polymer product, which had relatively low molecular weight, was a somewhat tacky and adhesive material that had excellent cold flow and easy spreading properties.

When the thereby-obtained polymer product is spread coated to about a 5 mil thickness over a ¼ inch by 8 inch by 8 inch panel of yellow pine wood over which is pressed a similarly sized sheet of clean aluminum, there is provided an excellent wood-to-metal adhesive bond capable of being firmly established by merely moderate pressing together (under an average applied pressure of, say, 1–10 pounds per square inch) of the aluminum sheet to the coated wood panel. The wood and metal are securely and rigidly joined by the polymeric adhesive yet are capable of being cleanly separated or delaminated without undue difficulty. This is accomplished by the simple operation of prying apart the bonded pieces, using a knife or other blade to facilitate the disjoinder. Similar results are obtained when using the polymer as a yieldable, pressure-sensitive type adhesive for joining wood to glass.

*Illustration "C"*

About 100 parts by weight of the same monomeric ethanethiol glycidyl ether compound prepared as in the first illustration and subsequently purified are mixed with about 1 part by weight of diethylene triamine in a large cylindrical container having an internal diameter of about an inch and a height of 8 inches. An exothermic reaction occurs almost immediately. A relatively tough yet rubbery solid polymer product is obtained having the same shape as the container in which the polymerization is performed and useful for various applications requiring such configurations.

Results similar to the foregoing are obtained when the general procedure of illustration "A" is repeated to manufacture any other of the compounds of the Formula I and when such monomeric products are converted, in the above-demonstrated or like ways, to various polymer products.

What is claimed is:

1. Bireactive compound having the structure:

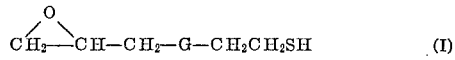

wherein G is a bivalent polyether radical selected from the group consisting of those of the structural formulae: —O—$(CH_2)_x$—O—, in which $x$ is an integer from 2 to 6; —O—$(CH_2CH_2$—O$)_y$, in which $y$ is an integer from 2 to 3; and —O—$(CH_2$—$CH(CH_3)$—O$)_z$, in which $z$ is an integer from 1 to 2.

2. The compound 2,(2 - (2,3 - epoxypropoxy)ethoxy-) ethanethiol.

(References on following page)

References Cited by the Examiner

UNITED STATES PATENTS

| | | | |
|---|---|---|---|
| 2,392,294 | 1/46 | Rust et al. | 204—158 |
| 2,398,479 | 4/46 | Vaughan et al. | 204—158 |
| 2,434,099 | 1/48 | Bousquet | 260—348 |
| 2,731,437 | 1/56 | Bender et al. | 260—348 |

OTHER REFERENCES

Shostakovsky et al., Academy of Sciences U.S.S.R. Bulletin, Division of Chemical Sciences, 1954, pages 963 to 970.

WALTER A. MODANCE, *Primary Examiner.*

IRVING MARCUS, NICHOLAS S. RIZZO, *Examiners.*

UNITED STATES PATENT OFFICE
CERTIFICATE OF CORRECTION

Patent No. 3,217,015

November 9, 1965

William R. Nummy

It is hereby certified that error appears in the above numbered patent requiring correction and that the said Letters Patent should read as corrected below.

Column 4, line 72, for "2,(2-(2,3-epoxypropoxy)ethoxy-)" read -- 2,(2-(2,3-epoxypropoxy)ethoxy-)ethoxy) --

Signed and sealed this 20th day of September 1966.

(SEAL)
Attest

ERNEST W. SWIDER
Attesting Officer

EDWARD J. BRENNER
Commissioner of Patents